(12) United States Patent
Ruprecht et al.

(10) Patent No.: US 7,753,186 B2
(45) Date of Patent: Jul. 13, 2010

(54) VEHICLE CLUTCH

(75) Inventors: Georg Ruprecht, Biessenhofen (DE); Falk Nickel, Fuchstal (DE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 776 days.

(21) Appl. No.: 11/552,308

(22) Filed: Oct. 24, 2006

(65) Prior Publication Data

US 2007/0089961 A1    Apr. 26, 2007

(30) Foreign Application Priority Data

Oct. 25, 2005    (EP) .................................. 05023302

(51) Int. Cl.
*F16D 43/21* (2006.01)
*F16D 13/04* (2006.01)
(52) U.S. Cl. .................................. 192/54.5; 192/70.23
(58) Field of Classification Search ............. 192/70.23, 192/89.21, 93 A, 54.5, 56.6
See application file for complete search history.

(56) References Cited

U.S. PATENT DOCUMENTS

| | | |
|---|---|---|
| 2,534,034 A | 12/1950 | Brie |
| 3,063,529 A | 11/1962 | Cook |
| 3,249,190 A | 5/1966 | Botnick |
| 3,264,894 A | 8/1966 | Popovich et al. |
| 3,335,835 A | 8/1967 | Conlon |
| 3,424,033 A | 1/1969 | Croswhite |
| 3,444,752 A | 5/1969 | Fisher et al. |
| 3,527,116 A | 9/1970 | Kimberlin |
| 3,648,537 A | 3/1972 | Burrell |
| 4,250,984 A | 2/1981 | Hoyler et al. |
| 4,645,049 A | 2/1987 | Matsuda et al. |
| 4,683,997 A | 8/1987 | Stockmar et al. |
| 4,732,253 A | 3/1988 | Nagayoshi et al. |
| 4,741,422 A | 5/1988 | Fuehrer et al. |
| 4,802,564 A | 2/1989 | Stodt |
| 4,844,219 A | 7/1989 | Stockmar |
| 5,186,070 A | 2/1993 | Nitzschke et al. |
| 5,720,375 A | 2/1998 | Maeda et al. |
| 5,924,327 A | 7/1999 | Neubauer et al. |

(Continued)

FOREIGN PATENT DOCUMENTS

DE    35 08 375    11/1985

(Continued)

OTHER PUBLICATIONS

European Search Report dated Jul. 10, 2006, for EPO Application No. 05023302.2.

(Continued)

*Primary Examiner*—David D Le
*Assistant Examiner*—Derek D Knight
(74) *Attorney, Agent, or Firm*—Sheridan Ross P.C.

(57) ABSTRACT

A vehicle clutch, particularly motorcycle clutch, is provided comprising a friction system; an engaging member acting on the friction system; and a spring adapted to be brought into operative communication with the engaging member via a bearing, wherein the engaging member is subdivided into an inner part and an outer part which is rotatable relative to the inner part by a defined turning angle, the spring has a degressive spring characteristic, and the bearing and the inner part are adapted to be brought into operative communication with one another via a surface arrangement constituting an inclined plane.

10 Claims, 1 Drawing Sheet

U.S. PATENT DOCUMENTS

| | | |
|---|---|---|
| 6,026,944 A | 2/2000 | Satou et al. |
| 6,247,569 B1 | 6/2001 | McGuire |
| 6,523,657 B1 | 2/2003 | Kundermann et al. |
| 6,827,191 B2 | 12/2004 | Kuhstrebe |
| 6,929,107 B2 | 8/2005 | Hegerath |
| 7,014,026 B2 * | 3/2006 | Drussel et al. .......... 192/105 B |
| 2003/0085094 A1 | 5/2003 | Miyoshi et al. |
| 2003/0116396 A1 | 6/2003 | Kuhstrebe |
| 2004/0050643 A1* | 3/2004 | Krzesicki et al. ......... 192/70.23 |
| 2006/0042904 A1 | 3/2006 | De Maziere |
| 2006/0042909 A1 | 3/2006 | De Maziere |
| 2007/0181399 A1 | 8/2007 | Ackermann |

FOREIGN PATENT DOCUMENTS

| | | |
|---|---|---|
| DE | 91 14 528 | 2/1992 |
| DE | 42 39 233 | 5/1994 |
| DE | 19833378 | 12/1999 |
| DE | 101 46 837 | 5/2002 |
| DE | 101 43 834 | 3/2003 |
| DE | 101 46 606 | 4/2003 |
| EP | 476005 | 3/1992 |
| EP | 0854304 | 7/1998 |
| EP | 1195537 | 4/2002 |
| EP | 1236936 | 9/2002 |
| EP | 1482 195 | 12/2004 |
| GB | 14688 | 5/1916 |
| GB | 774824 | 5/1957 |
| JP | 60184721 | 9/1985 |
| JP | 10 089377 | 4/1998 |
| WO | 9015272 | 12/1990 |
| WO | WO 9015272 | 12/1990 |

OTHER PUBLICATIONS

Office Action of Related U.S. Appl. No. 11/212,472, May 11, 2007, 9 pages.

Office Action of Related U.S. Appl. No. 11/212,473, May 22, 2007, 11 pages.

* cited by examiner

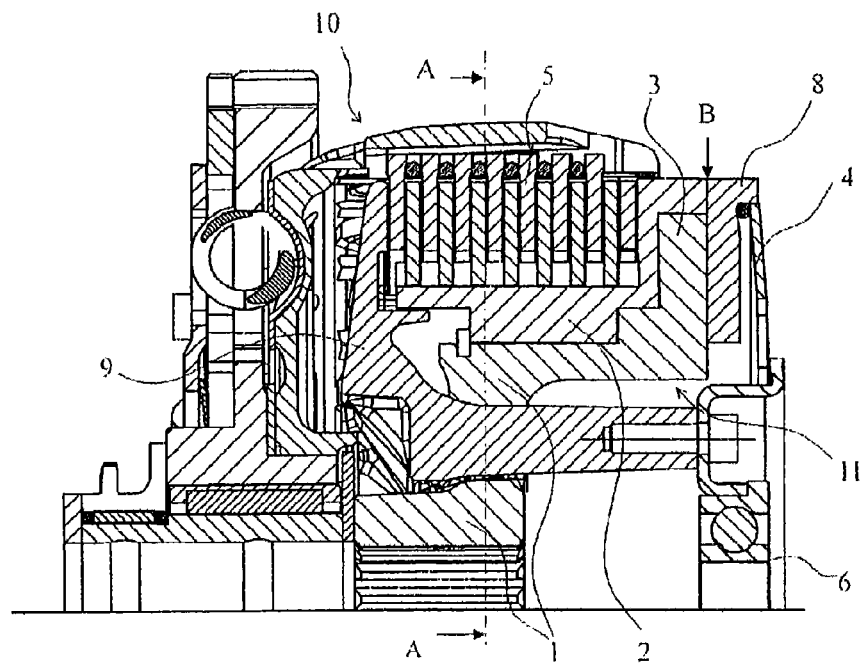
FIG. 1
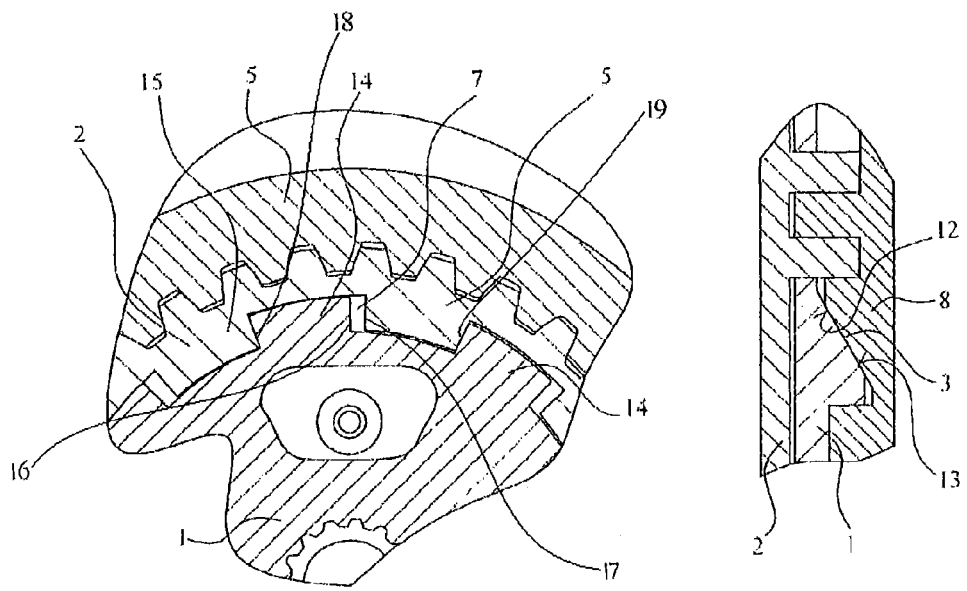
FIG. 2                    FIG. 3

VEHICLE CLUTCH

This application claims the benefit of European Patent Application Serial No. 05023302.2, filed Oct. 25, 2005, the entire disclosure of which is incorporated by reference herein.

FIELD OF THE INVENTION

The present invention relates to a vehicle clutch, particularly a motorcycle clutch.

BACKGROUND OF THE INVENTION

Vehicle torques, particularly of motorcycles, have constantly increased in the past years. That is why the actuating forces of clutches are also more and more increasing. At the same time, the motorcycle manufacturers increasingly address female customers in order to extend their market share. This makes it necessary to enhance the comfort for the male or female driver with suitable measures by way of a small manual force for the clutch.

At the same time, the above-mentioned high transmittable clutch torques entail the safety problem that the rear wheel may start to hop under deceleration or overrun conditions if there is e.g. a downshifting to high revolution speed. In principle, this can be avoided when the clutch is opened on deceleration or overrun or is operated in the slip mode. Experienced drivers may take such a measure themselves by pulling the clutch lever in a finely regulated manner. However, to minimize the risk for all drivers, the use of an automatically usable mechanism is desirable, such mechanism opening the clutch on deceleration or overrun at least in part.

Clutch systems that are known on the market apply an additional force to the pressure plate on deceleration or overrun or to the piston of the clutch in an opposite direction relative to the spring force so as to open the clutch. This always creates an impact on the clutch lever due to the lifting of the pressure plate, which is considered by the driver as objectionable. Furthermore, these clutch systems operate with additional springs, whereby the manufacturing costs are increased.

SUMMARY OF THE INVENTION

It is therefore the object of the present invention to provide a vehicle clutch, particularly a motorcycle clutch, which permits an at least partial opening of the clutch on deceleration or overrun in a simple way that is comfortable for the driver.

According to the invention the degressive spring characteristic of the clutch spring is exploited in combination with a ramp arrangement forming an inclined plane between the bearing of the spring and an inner part of the two-part engaging member to accomplish a limitation of the deceleration or overrun moment without any impact on the manual clutch operation.

The special advantages of the clutch according to the invention encompass low complexity and thus low manufacturing costs.

Furthermore, a sensitive initiation of the limitation function is possible because the support force decreases with the operation path.

Finally, an impact on the manual operating force or the operation path is prevented, as has already been mentioned above.

The subclaims refer to advantageous developments of the invention.

In principle, it is possible to use the deceleration moment of the vehicle for releasing the clutch.

In a variant of the invention, the clutch may also be employed in a parallel- or series-active manner. An actuator replaces the deceleration moment of the vehicle in this case. In combination with the inclined plane, the transmitted torque can thereby be minimized any time. For instance, a decoupling with the help of an actuator is possible in an appropriately safe way already in the case of a small deceleration moment of the vehicle, which already causes problems on flat ground.

Low complexity and thus low costs also belong to the advantages of such an active configuration achieved with the actuator.

In this system, too, an impact on the operating force or the operation path of the clutch is avoided.

Although the vehicle clutch according to the invention shows special advantages particularly in motorcycles, its use is also possible in other engine-driven vehicles (e.g. ATVs).

Further details, advantages and features of the present invention become apparent from the following description of the attached drawing with reference to the figures.

BRIEF DESCRIPTION OF THE DRAWINGS

FIG. 1 is a sectional view of a clutch according to the invention;

FIG. 2 is a sectional view of the clutch according to FIG. 1 along line A-A in FIG. 1; and FIG. 3 shows detail B of the clutch according to the invention, as indicated in FIG. 1.

To assist in the understanding of the present invention the following list of components and associated numbering found in the drawings is provided herein:

\# Component
1 inner part/hub
2 outer part
3 inclined plane/ramp arrangement
4 spring/disk spring
5 friction system
6 slave cylinder
7 free space according to FIG. 2 for symbolizing the turning angle
8 bearing/spring support
9 pressure plate
10 clutch
11 engaging member
12 oblique surfaces of the inclined plane 3
13 oblique surfaces of the inclined plane 3
14 cams
15 cams
16 front side of inner part cam
17 front side of outer part cam
18 back side of inner part cam
19 back side of outer part cam

DETAILED DESCRIPTION

The clutch 10 of the invention as shown in FIG. 1 is a vehicle clutch, particularly in the form of a motorcycle clutch. Apart from the parts also provided in conventional clutches, which are here not explained in more detail as they are not needed for explaining the principles of the invention, the clutch 10 comprises a friction system, particularly in the form of a disk pack 5 that is in operative communication with an engaging member 11.

Furthermore, a spring 4 is provided that acts on the engaging member 11 via a bearing 8.

According to the invention the engaging member 11 is of a bipartite configuration and comprises an inner part or a hub 1 and an outer part 2 which is arranged to be rotatable relative to the inner part 1 by a defined turning angle. This turning angle is symbolized in FIG. 2 by the free space 7 drawn there between cams of the inner part 1 and the outer part 2, two cams 14 of the inner part 1 and two cams 15 of the outer part 2 being each marked with the respective reference numerals by way of example. The cam 14 of the inner part 1 includes a front side 16 that engages a front side 17 of the cam 15 of the outer part 2 that are adapted to be brought into operative communication with one another for transmitting the clutch torque. The cam 14 of the inner part 1 includes a back side 18 that engages a back side 19 of the cam 15 of the outer part 2 that are adapted to be brought into contact by rotating the inner part relative to the outer part by the defined turning angle.

According to the invention spring 4 has a degressive spring characteristic.

The bearing 8 and the inner part 1 of the engaging member 11 are in operative communication with an inclined plane or ramp arrangement symbolized in FIG. 1 by reference numeral 3, the inclined plane 3 in FIG. 3 being shown in detail.

Hence, the inclined plane 3 shows a surface arrangement of an oblique surface 12 of the bearing 8 and an oblique surface 13 of the inner part 1, as becomes apparent in detail from the detailed illustration in FIG. 3 and of detail B in FIG. 1. The inclined plane or ramp arrangement 3 and the oblique surfaces 12 and 13 thereof are here arranged to be oblique to a planar surface which, in turn, is perpendicular to the axis of rotation of the clutch 10.

Since the engaging member 11 of the clutch 10 of the invention is of a bipartite configuration, the inner part or hub 1 of the engaging member 11 can be rotated relative to the outer part 2 by the above-explained defined angle 7. In the inoperative state of the clutch 7 and in the engaged state, the cams 14 and 15, respectively, of the inner and outer parts 1 and 2, respectively, as can be seen in FIG. 2, are adjacent to one another, and it is possible to transmit the maximum clutch torque.

Under deceleration or overrun conditions the inner part 1 rotates relative to the outer part 2 for instance by exploiting the deceleration moment of the vehicle, and after rotation by the defined turning angle 7 the back sides of the cams 14 and 15, respectively, get into contact. Due to the rotation the spring 4 with its degressive characteristic is further biased via the inclined plane 3 between the bearing 8 and the inner part 1. Due to the degressive characteristic the normal force of spring 4 on the friction system 5 is thereby reduced, whereby, in turn, the transmittable deceleration moment of the clutch 10 is reduced. As a consequence, the clutch 10 can already slip at low moments of deceleration. The interfaces with the operating unit, e.g. a slave cylinder 6 of the clutch 10, remain unchanged, with no impacts on the driver's hand on the clutch lever.

In other words, the clutch 10 according to the invention is distinguished by the connection of a mechanical ramp construction (inclined plane 3) with the spring, particularly disk spring 4, which has a degressive characteristic. It is not the pressure plate 9 of the clutch that is here lifted, but the bearing 8 or spring support of the disk spring 4 is displaced, whereby the spring 4 is further biased. Due to the degressive characteristic, however, the biasing force of the spring 4 on the pressure plate 9 and thus on the friction system 5 decreases, whereby the clutch 10 can more easily slip and the deceleration moment can thus be limited in a defined way.

Moreover, the pressure plate 9 is advantageously not moved in the clutch 10 according to the invention, i.e. there is no objectionable impact on the driver's hand on the clutch lever, which has already been explained previously.

In an active variant of the construction of the clutch 10 according to the invention, which is not shown in more detail in the figures, the inner part 1 is rotated in addition or exclusively with a suitable actuator, preferably electrically or hydraulically, relative to the outer part 2. The actuator sets the desired limited transmission torque through the defined angle. The action of the actuator can e.g. be initiated by detecting the respective requirement, for instance an ABS action, a throttle valve position, a wheel speed, etc.

As a supplement to the disclosure, and in addition to the above written description, explicit reference is here made to the illustrative drawing according to FIGS. 1 to 2, and these figures are herewith referred to.

What is claimed is:

1. A vehicle clutch, particularly motorcycle clutch, comprising:
   a friction system;
   an engaging member acting on the friction system;
   a spring adapted to be brought into operative communication with the engaging member via a bearing; and
   wherein the engaging member is subdivided into an inner part and an outer part which is rotatable relative to the inner part by a defined turning angle, the spring has a degressive spring characteristic, and the bearing and the inner part are adapted to be brought into operative communication with one another via a ramp arrangement constituting an inclined plane.

2. The clutch according to claim 1, wherein the inner part comprises cams and the outer part comprises cams, said cams each having front sides and back sides and being adapted to be brought into operative communication with one another for transmitting the clutch torque.

3. The clutch according to claim 2, wherein in a deceleration mode of the clutch the back sides of the cams are adapted to be brought into contact by rotating the inner part relative to the outer part by the defined turning angle.

4. The clutch according to claim 1, wherein the rotation of the inner part relative to the outer part can be produced by exploiting a deceleration moment of the vehicle.

5. The clutch according to claim 1, wherein the spring is configured as a disk spring.

6. A vehicle clutch, particularly motorcycle clutch, comprising:
   a friction system;
   an engaging member acting on the friction system;
   a spring adapted to be brought into operative communication with the engaging member via a bearing;
   wherein the engaging member is subdivided into an inner part and an outer part which is rotatable relative to the inner part by a defined turning angle, the spring has a degressive spring characteristic, and the bearing and the inner part are adapted to be brought into operative communication with one another via a ramp arrangement constituting an inclined plane; and
   whereby the bearing is displaced so that the spring is further biased and the biasing force of the spring and thus the force on the friction system decreases.

7. A vehicle clutch, particularly motorcycle clutch, comprising:
   a friction system;
   an engaging member acting on the friction system;

a spring adapted to be brought into operative communication with the engaging member via a bearing;

wherein the engaging member is subdivided into an inner part and an outer part which is rotatable relative to the inner part by a defined turning angle, the spring has a degressive spring characteristic, and the bearing and the inner part are adapted to be brought into operative communication with one another via a ramp arrangement constituting an inclined plane;

wherein the inner part comprises cams and the outer part comprises cams, said cams each having front sides and back sides and being adapted to be brought into operative communication with one another for transmitting the clutch torque; and wherein in an inoperative state and in an engage state of the clutch the cams rest with their front sides on one another for maximum torque transmission.

8. The clutch according to claim 7, wherein in a deceleration mode of the clutch the back sides of the cams are adapted to be brought into contact by rotating the inner part relative to the outer part by the defined turning angle.

9. The clutch according to claim 7, wherein the rotation of the inner part relative to the outer part can be produced by exploiting the deceleration moment of the vehicle.

10. The clutch according to claim 7, wherein the spring is configured as a disk spring.

* * * * *